(12) United States Patent
Chang et al.

(10) Patent No.: US 6,705,735 B1
(45) Date of Patent: Mar. 16, 2004

(54) PROJECTING DEVICE FOR DISPLAYING COMPUTER IMAGE

(75) Inventors: Chong-Min Chang, Taipei (TW); Han-Ping D. Shieh, Hsinchu (TW); Chen Shih-Pin, Taipei Hsien (TW)

(73) Assignee: BenQ Corporation, Kweishan (TW)

( * ) Notice: Subject to any disclaimer, the term of this patent is extended or adjusted under 35 U.S.C. 154(b) by 0 days.

(21) Appl. No.: 09/266,834

(22) Filed: Mar. 12, 1999

(30) Foreign Application Priority Data

Sep. 2, 1998 (TW) .................................. 87114588 A

(51) Int. Cl.$^7$ ............................................. G03B 21/28
(52) U.S. Cl. ........................................ 353/99; 348/771
(58) Field of Search ........................... 353/98, 99, 31; 348/742, 743, 771

(56) References Cited

U.S. PATENT DOCUMENTS

| | | | | |
|---|---|---|---|---|
| 4,680,579 A | * | 7/1987 | Ott | |
| 5,467,146 A | * | 11/1995 | Huang et al. | 348/743 |
| 5,706,061 A | * | 1/1998 | Marshall et al. | 348/743 |
| 5,831,601 A | * | 11/1998 | Vogeley et al. | 345/175 |
| 5,863,125 A | * | 1/1999 | Doany | 353/84 |
| 5,909,204 A | * | 6/1999 | Gale et al. | 345/85 |
| 5,921,650 A | * | 7/1999 | Doany et al. | 353/31 |
| 5,967,636 A | * | 10/1999 | Stark et al. | 353/84 |

* cited by examiner

Primary Examiner—William Dowling
(74) Attorney, Agent, or Firm—Winston Hsu

(57) ABSTRACT

The present invention discloses a projecting device without prisms. The projecting device comprises a light source for generating an incident light beam, a reflective image module comprising a plurality of reflective surfaces which can be separately controlled to generate the image-containing reflected light beam, a first lens set for concentrating the incident light beam, a reflective mirror for reflecting the incident light beam and concentrating the light beam through the first lens set onto the image module, and a second lens set installed between the light source and the reflective mirror for shortening an optical path from the light source to the reflective mirror. The optical path of the incident light beam reflected from the image module intersects a plane formed by the optical paths of the incident light beam from the light source to the reflective mirror and from the reflective mirror to the image module at one point, thus interference of the light beams is prevented.

22 Claims, 3 Drawing Sheets

PROJECTING DEVICE FOR DISPLAYING COMPUTER IMAGE

BACKGROUND OF THE INVENTION

1. Field of the Invention

The present invention relates to a projecting device, and more particularly, to a projecting device for displaying computer images.

2. Description of the Prior Art

Digital micro-mirror devices are often used as image modules in reflective projecting devices for generating images by reflection and for projecting images. However, the distances between incident light beams and reflected light beams in such projecting devices are often small. Therefore, in order to avoid unwanted interference between light beams, the projecting devices must be made very large.

Please refer to FIG. 1. FIG. 1 is a perspective view of a prior art reflective projecting device 10. The reflective projecting device 10 comprises a reflective image module 12 comprising a plurality of controllable reflective surfaces (not shown) for modulating an incident light beam 11 and generating an image-containing reflected light beam 13, a total reflecting prism 14 for preventing interference between the incident light beam 11 emitted to and the reflected light beam 13 reflected from the image module 12, an optical device 16 such as a dichromatic mirror or a dichromatic prism, and a projecting lens 18 for focusing the image-containing reflected light beam 13 and outputting the image.

The projecting device 10 uses the total reflecting prism 14 to prevent unwanted interference between the incident light beam 11 emitted to and the reflective light beam 13 reflected from the image module 12. A long post focal distance 19, i.e. a long distance between the image module 12 and projecting lens 18, is therefore required. Therefore, the projecting device 10 must be very large and complicated leading to increased manufacturing cost. The prism 14 shortens ray traces of the incident light beam 11 and the reflective light beam 13 but also refracts light which causes chromatic aberrations and deterioration of the image. Also, the prism 14 reflects undesired deviated light onto the projecting lens 18 which lowers image contrast. Finally, assembly requirements for the total reflecting prism 14 are rigid which increases complexity of the structure and cost of manufacturing.

SUMMARY OF THE INVENTION

It is therefore a primary objective of the present invention to provide a projecting device to solve the above mentioned problems.

In a preferred embodiment, the present invention provides a projecting device comprising:

a light source for generating an incident light beam;

a reflective image module comprising a plurality of controllable reflective surfaces for modulating the incident light beam and generating a reflected image-containing light beam;

a first lens set for concentrating the incident light beam;

a reflective mirror for reflecting the incident light beam from the light source onto the image module through the first lens set; and a second lens set installed between the light source and the reflective mirror for shortening an optical path from the light source to the reflective mirror;

wherein the optical path of the incident light beam reflected from the image module intersects a plane formed by the optical paths of the incident light beam from the light source to the reflective mirror and from the reflective mirror to the image module at one point.

It is an advantage of the present invention that the lens sets and the reflective mirror of the projecting device are specially arranged to prevent light crossings and to shorten the optical path thereby reducing the overall size of the projecting device. Moreover, the projecting device does not use prisms and so there is no generation of chromatic aberrations and no deviation of light. This results in ease of installation and lower manufacturing costs.

This and other objectives of the present invention will no doubt become obvious to those of ordinary skill in the art after having read the following detailed description of the preferred embodiment which is illustrated in the various figures and drawings.

Table. 1 is a list of the reference optical data in the first preferred embodiment.

Table. 2 is a list of the reference optical data in the second preferred embodiment.

Table. 3 is a list of the reference optical data in the third preferred embodiment.

Table. 4 is a list of the reference optical data in the fourth preferred embodiment.

DETAILED DESCRIPTION OF THE PREFERRED EMBODIMENT

Figure 1:
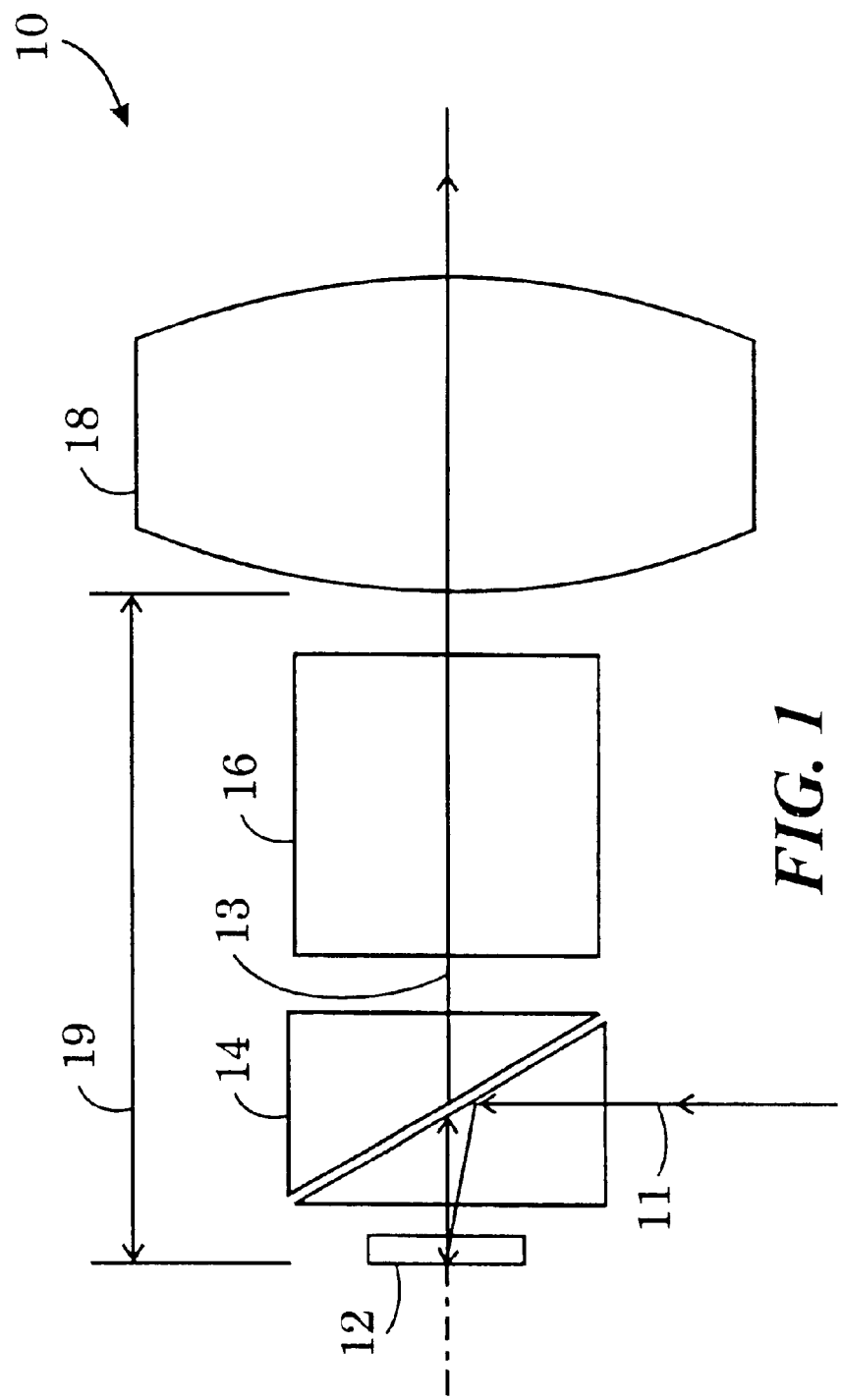
FIG. 1 is a schematic view of a prior art reflective projecting device.
Figure 2:
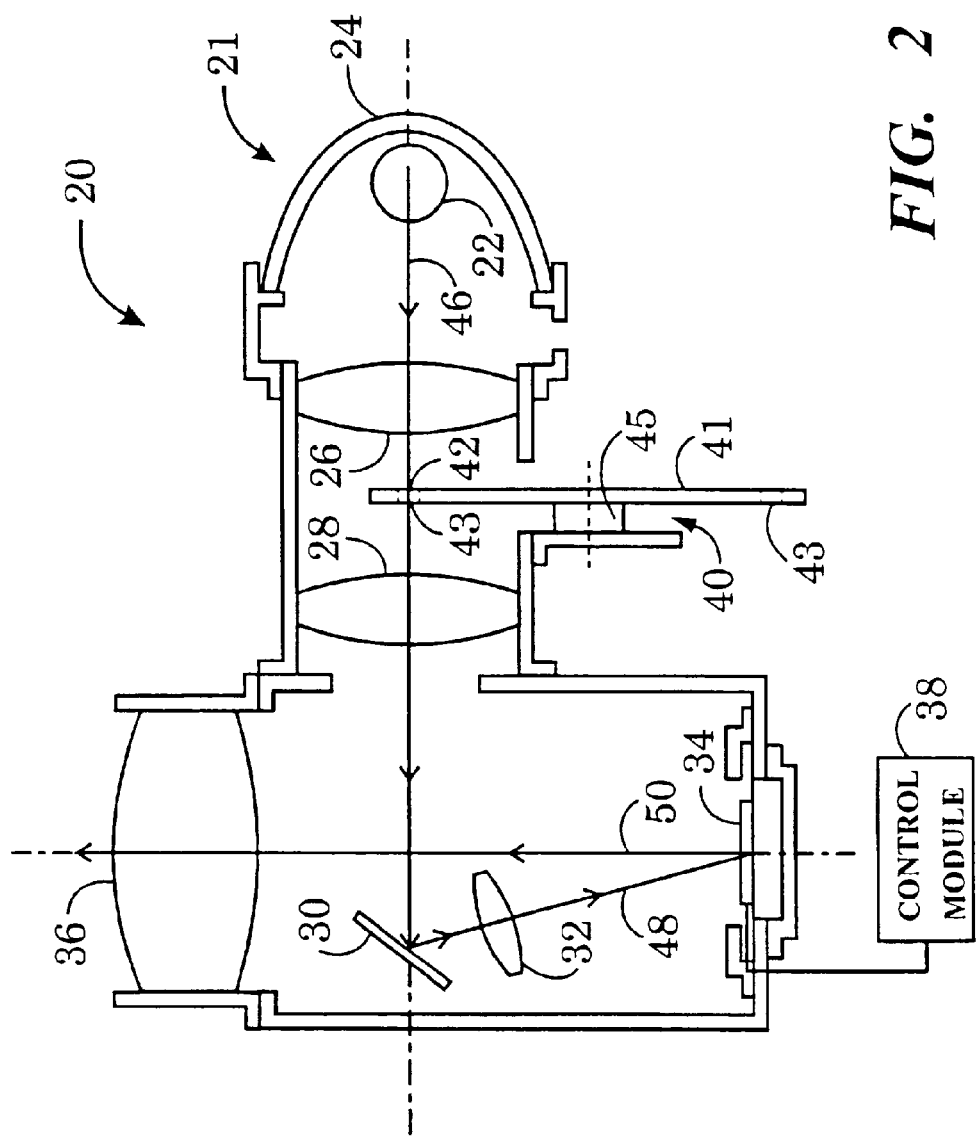
FIG. 2 is a schematic view of a projecting device according to the present invention.

Please refer to FIG. 2. FIG. 2 is a schematic view of a projecting device 20 according to the present invention. The projecting device 20 comprises a light source 21, a third lens set 26, a rotatable color wheel 40, a second lens set 28, a reflective mirror 30, a first lens set 32, a reflective image module 34, a projecting module 36, and a control module 38 for outputting image control signals to the image module 34.

The light source 21 comprises a light bulb 22 and a curved reflective mirror 24 and produces a first incident light beam 46. A third lens set is installed between the light source 21 and a rotatable color-filtering color wheel 40 for focusing the first incident light beam 46 onto the color filters. The rotatable color wheel 40 rotates to color the first incident light beam 46 for sequentially producing red, green, and blue lights. The filtered first incident light beam 46 then passes through the second lens set 28 which shortens the optical path of the first incident light beam 46 to the reflective mirror 30 where it is reflected to the first lens set 32 which concentrates this second incident light beam 48 onto the image module 34. The image module 34 could be a reflective liquid crystal display or a digital micro-mirror device which comprises a plurality of individually controllable micro-mirrors arranged in matrix formation. Based on control signals received from the control module 38, the image module 34 modulates the second incident light beam 48 to produce an image-containing reflected light beam 50 which is passed to the projecting module 36 where it is focused and outputted.

The rotatable color wheel 40 comprises a plurality of transparent red, green and blue color filters 48 each installed at positions 42 on a round panel 41 equidistant from its center. The rotatable color wheel rotates at a constant speed along its axis 45 to filter the first incident light beam 46 to sequentially produce red, green and blue lights in turn. This filtered reflected light beam 50 is output in the appearance of a composed image due to persistence of vision of the user.

The first and second lens sets 32, 28 of the projecting device 20 have positive diopters that substantially reduce the total length of the optical path of the incident light beam 46 from the light source 21 to the image module 34. After processing by the color filters, the incident light beam 46 is ultimately concentrated on the image module 34 with maximum light usage efficiency by that the concentrated spot size of the incident light beam 46 is just enough to cover the entire reflective surface of the image module 34. The reflective mirror 30 and image module 34 are arranged at angles such that crossing of the light beams in three-dimensional space of the incident light beam 48, the reflected light beam 50 and the incident light beam 46 is prevented. This in turn allows greater reduction in the size of the projecting device 20.

Figure 3:
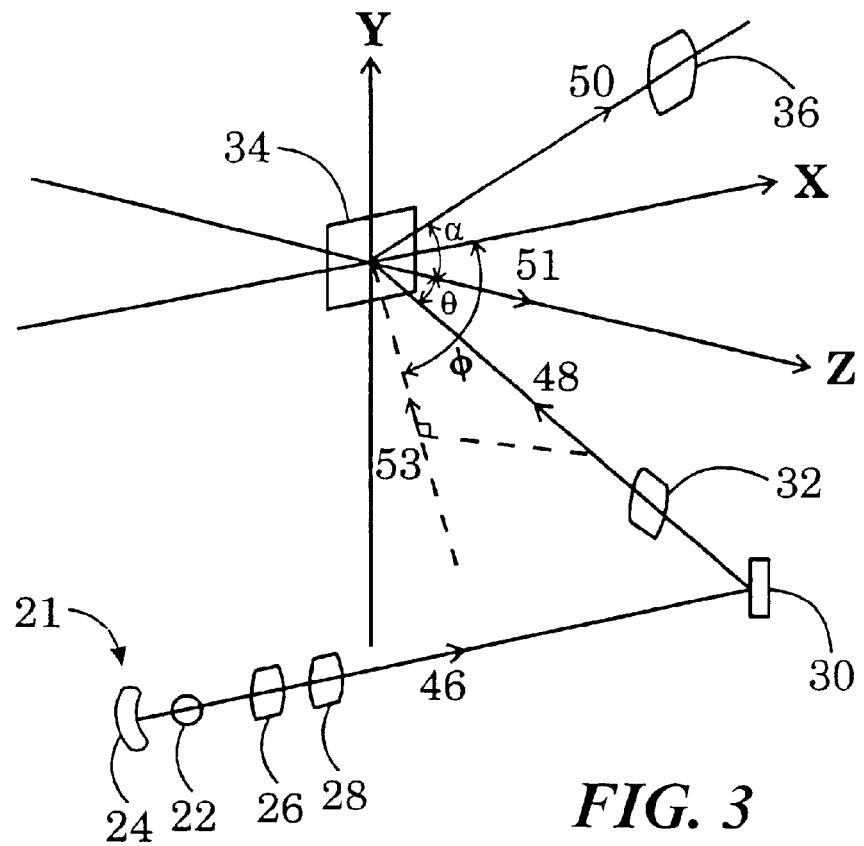
FIG. 3 is a ray trace diagram of the light beam shown in FIG. 2.

Please refer to FIG. 3. FIG. 3 is a ray trace diagram of the light beams 46, 48, and 50 in a three-dimensional space formed by x, y, and z-axes. The first incident light beam 46 is generated by the light source 21, and then travels through the optic axis of the third and second lens sets 26 and 28 to the reflective mirror 30 where it is reflected to pass through the first lens set 32 to become the second incident light beam 48. The angle between the optic axis and the x-axis is between 0 to 15 degrees. The second incident light beam 48 is then reflected by the image module 34 in the X-Y plane to form the reflected light beam 50, which is then emitted through the projecting module 36. FIG. 3 also shows that the normal line 51 (the positive z-axis) of the reflective surface of the image module 34 intersects the plane formed by light beams 46 and 48 at zero point. The position of the y-axis of the image module 34 is higher than the position of the y-axis of the reflective mirror 30 and the light source 21 but lower than that of the projecting module 36.

Wherein the angle α between the reflected light beam 50 and the normal line 51 (positive direction of z-axis) of the image module 34 is between 2 to 18 degrees, the angle θ between the second incident light beam 48 along the optic axis of the first lens set and the normal line 51 is between 21 to 35 degrees and the angle φ between an x-y plane projection line 53 of the optic axis of the first lens set 32 and the x-axis is between −48 to −68 degrees. The lens sets 26, 28 and 32 together with the reflective mirror 30 can form a bent optical path 46, 48 throughout its course through the optic axis and between each lens set. This 3-D design can dramatically reduce the volume of the projecting device 20.

In the projecting device 20, the first lens set 32 could be a positive lens of aspherical plane-convex or aspherical biconvex, and the conic of the positive lens is between −1.2 and −0.45. Also, in order to maintain light efficiency while diminishing the height of the projecting device 20 and preventing interference of the reflected light beam 50 generated by the image module 34 with the first lens set 32, areas not occupied by the incident light beam 48 are eliminated to prevent shading of the reflected light beam 50. Further reduction of the size of the projecting device 20 may be achieved by making the angle between light beams 48 and 50 as small as possible.

In the projecting device 20, the second lens set 28 usually comprises two positive lenses. The size of the image module 34 may be changed to accommodate improvements in its resolution. The size of the image module 34 may be minimized while maintaining high efficiency of light usage if the two lens sets 28, 32 fit the following conditions:

$$1.1 \leq \frac{|F_A + F_B|}{F_A} \leq 1.7,$$

$$0.5 \leq \sqrt{\left|\frac{F_B}{F_{AB}}\right|} \leq 1.1,$$

where $F_A$ is the focal length of the first lens set, $F_B$ is the focal length of the second lens set, and $F_{AB}$ is the combined focal length of the two lens sets.

Figure 4:
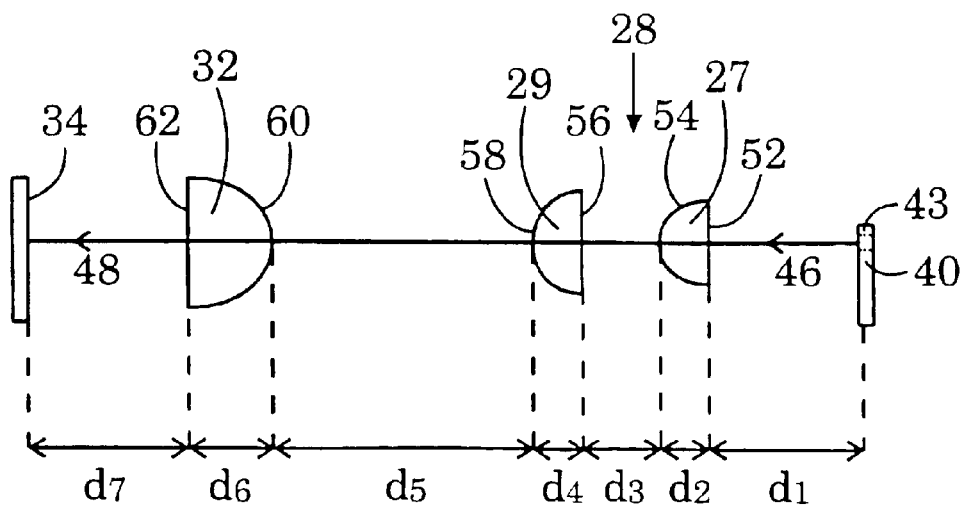
FIG. 4 is a positioning diagram showing relative positions of the first and second lens sets shown in FIG. 2.

Please refer to FIG. 4. FIG. 4 is a positioning diagram showing relative positions of the first and second lens sets 32, 28. The second lens set 28 comprises a first lens 27 and a second lens 29. The first lens 27, second lens 29, and first lens set 32 are aspherical lenses each comprising a front side and a rear side. The incident light beam 46 passes through a color filter 43 of the rotatable color wheel 40, the front side 52 of the first lens 27, the rear side 54 of the first lens 27, the front side 56 of the second lens 29, the rear side 58 of the second lens 29, the front side 60 of the first lens set 32, and the rear side 62 of the first lens set 32, and forms the incident light beam 48 which is passed onto the image module 34.

Please refer to Table 1 to Table 4. There are a variety of designs in the indexes of refraction, the radii of curvature of the front side and the rear side, the relative positioning of the first lens 27, second lens 29, and the first lens set 32. Table 1 to Table 4 illustrate four preferred embodiments. The thickness of the first lens 27 (d2) is 6 mm, the distance from the first lens 27 to the second lens 29 (d3) is 1 mm; the thickness of the second lens 29 (d4) is 6 mm, the distance of the second lens 29 to the first lens set 32 (d5) is 70 mm, and the thickness of the first lens set 32 (d6) is 17 mm. The index of refraction of each lens, is calculated corresponding to a wavelength 0.587 μm. The conic of the first lens 32 in Table 2 is −1.00 and is −0.97 in Tables 1, 3 and 4. Other related optical data are listed in Table 1 to Table 4.

In the present invention, the lens sets 28,32 and the reflective mirror 30 of the projecting device 20 are arranged so as to shorten the optical paths and prevent crossing of light beams thereby reducing the overall size of the projecting device. Since the projecting device 20 does not contain prisms, there is no generation of chromatic aberrations and deviations of light. This results in ease of installation and lower manufacturing costs.

Those skilled in the art will readily observe that numerous modifications and alterations of the device may be made while retaining the teachings of the invention. Accordingly, the above disclosure should by construed as limited only by the metes and bounds of the appended claims.

What is claimed is:

1. A projecting device comprising:

a light source for generating an incident light beam;

a reflective image module comprising a plurality of controllable reflective surfaces for modulating the incident light beam and generating a reflected image-containing light beam;

a first lens set for concentrating the incident light beam;

a reflective mirror for reflecting the incident light beam from the light source onto the image module through the first lens set; and a second lens set installed between the light source and the reflective mirror for shortening the optical path from the light source to the reflective mirror;

wherein the optical path of the incident light beam reflected from the image module intersects a plane formed by the optical paths of the incident light beam from the light source to the reflective mirror and from the reflective mirror to the image module at only one point.

2. The projecting device of claim 1 wherein the first lens set is a positive lens of aspherical plane-convex or aspherical biconvex, and the conic of the positive lens is between −1.2 and −0.45.

3. The projecting device of claim 1 wherein the second lens set is formed by two positive lenses, and the first and second lens sets satisfy the following conditions:

$$1.1 \le \frac{|F_A + F_B|}{F_A} \le 1.7,$$

$$0.5 \le \sqrt{\left|\frac{F_B}{F_{AB}}\right|} \le 1.1,$$

over which $F_A$ is the focal length of the first lens set, $F_B$ is the focal length of the second lens set, and $F_{AB}$ is the combined focal length of the two lens sets.

4. The projecting device of claim 1 wherein the incident light beam generated by the light source is concentrated by the second lens set and then the first lens set before it is transmitted to the image module so that the total length of the optical path from the light source to the image module is substantially reduced.

5. The projecting device of claim 1 wherein the light source comprises a curved reflective mirror for reflecting light generated by the light source toward one direction so as to form the incident light beam of the light source.

6. The projecting device of claim 1 wherein the light reflecting angle of each of the reflective surfaces of the image module can be separately controlled by the image module so as to generate the image-containing reflected light beam.

7. The projecting device of claim 6 wherein the image module is a digital micro-mirror device.

8. The projecting device of claim 1 wherein the image module is a reflective liquid crystal display.

9. The projecting device of claim 1 further comprising a rotatable color wheel installed between the light source and the second lens set for altering the color of the incident light beam generated by the light source.

10. The projecting device of claim 9 wherein the color wheel comprises a round panel having a plurality of transparent color filters installed around its periphery for converting the incident light beam into various colored light beams when the color wheel is rotated.

11. The projecting device of claim 10 wherein the color wheel comprises red, green and blue color filters for converting the incident light beam into red, green and blue incident light beams.

12. The projecting device of claim 11 wherein the red, green and blue color filters are sequentially arranged for generating red, green and blue incident light beams in turn.

13. The projecting device of claim 1 further comprising a third lens set installed between the light source and the rotatable color wheel for focusing the incident light beam generated by the light source onto the color filters.

14. The projecting device of claim 1 wherein the first and second lens sets have positive refractive power.

15. The projecting device of claim 14 wherein the first lens set is an aspherical lens and the second lens set comprises a first lens and a second lens wherein the first lens set and the first and second lenses of the second lens set each comprises a front side and a rear side, and the incident light beam emitted from the light source is transmitted sequentially through the front side of the first lens, the rear side of the first lens, the front side of the second lens, the rear side of the second lens, the front side of the first lens set and the rear side of the first lens set.

16. The projecting device of claim 15 wherein the reference data of the first and second lenses of the second lens set and first lens set are listed below:

the index (the wavelength is 0.587 $\mu$m) of refraction of the first lens=1.74, the index (the wavelength is 0.587 $\mu$m) of refraction of the second lens=1.52, the index (the wavelength is 0.587 $\mu$m) of refraction of the first lens set=1.52, the conic of the first lens set=−0.97, the radius of curvature of the front side of the first lens=infinity, the radius of curvature of the rear side of the first lens=14 mm, the radius of curvature of the front side of the second lens=infinity, the radius of curvature of the rear side of the second lens=16 mm, the radius of curvature of the front side of the first lens set=−21 mm, the radius of curvature of the rear side of the first lens set=infinity, the thickness of the first lens=6 mm, the distance from the rear side of the first lens to the front side of the second lens=1 mm, the thickness of the second lens=6 mm, the distance from the rear side of the second lens to the front side of the first lens set=70 mm, and the thickness of the first lens set=17 mm.

17. The projecting device of claim 15 wherein the reference data of the first and second lenses of the second lens set and first lens set are listed below:

the index (the wavelength is 0.587 $\mu$m) of refraction of the first lens=1.74, the index (the wavelength is 0.587 $\mu$m) of refraction of the second lens=1.74, the index (the wavelength is 0.587 $\mu\mu$m) of refraction of the first lens set=1.52, the conic of the first lens set=−1.00, the radius of curvature of the front side of the first lens=60 mm, the radius of curvature of the rear side of the first lens=12 mm, the radius of curvature of the front side of the second lens=infinity, the radius of curvature of the rear side of the second lens=16 mm, the radius of curvature of the front side of the first lens set=−21 mm, the radius of curvature of the rear side of the first lens set=infinity, the thickness of the first lens=6 mm, the distance from the rear side of the first lens to the front side of the second lens=1 mm, the thickness of the second lens=6 mm, the distance from the rear side of the second lens to the front side of the first lens set=70 mm, and the thickness of the first lens set=17 mm.

18. The projecting device of claim 15 wherein the reference data of the first and second lenses of the second lens set and first lens set are listed below:

the index (the wavelength is 0.587 μm) of refraction of the first lens=1.74, the index (the wavelength is 0.587 μm) of refraction of the second lens=1.52, the index (the wavelength is 0.587 μm) of refraction of the first lens set=1.52, the conic of the first lens set=−0.97, the radius of curvature of the front side of the first lens=infinity, the radius of curvature of the rear side of the first lens=15.5 mm, the radius of curvature of the front side of the second lens=infinity, the radius of curvature of the rear side of the second lens=17 mm, the radius of curvature of the front side of the first lens set=−21 mm, the radius of curvature of the rear side of the first lens set=infinity, the thickness of the first lens=6 mm, the distance from the rear side of the first lens to the front side of the second lens=1 mm, the thickness of the second lens=6 mm, the distance from the rear side of the second lens to the front side of the first lens set=70 mm, and the thickness of the first lens set=17 mm.

19. The projecting device of claim 15 wherein the reference data of the first and second lenses of the second lens set and first lens set are listed below:

the index (the wavelength is 0.587 μm) of refraction of the first lens=1.74, the index (the wavelength is 0.587 μm) of refraction of the second lens=1.52, the index (the wavelength is 0.587 μm) of refraction of the first lens set=1.52, the conic of the first lens set=−0.97, the radius of curvature of the front side of the first lens=infinity, the radius of curvature of the rear side of the first lens=18.5 mm, the radius of curvature of the front side of the second lens=infinity, the radius of curvature of the rear side of the second lens=17 mm, the radius of curvature of the front side of the first lens set=−21 mm, the radius of curvature of the rear side of the first lens set=infinity, the thickness of the first lens=6 mm, the distance from the rear side of the first lens to the front side of the second lens=1 mm, the thickness of the second lens=6 mm, the distance from the rear side the second lens to the front side of the first lens set=70 mm, and the thickness of the first lens set=17 mm.

20. The projecting device of claim 1 further comprising a projecting module for projecting the light beam reflected by the image module onto a screen.

21. The projecting device of claim 20 wherein the angle formed by the projecting light beam and the normal line of the image module is between 2 to 18 degrees, the angle formed by the optical axis of the first lens set and the normal line of the image module is between 21 to 35 degrees, and the angle formed by a line defined by projecting the optical axis of the first lens set onto the surface on which the image module is located and the normal line of a plane formed by the projected light beam and the normal line of the image module is between −48 to −68 degrees.

22. The projecting device of claim 1 wherein the incident light beam produced by the light source will be transmitted along the direction by the optical axis of the second lens set, and wherein the angle formed by the optical axis of the second lens set and a plane containing the image module is between 0 to 15 degrees.

* * * * *